(12) United States Patent
Grossman

(10) Patent No.: US 6,360,990 B1
(45) Date of Patent: Mar. 26, 2002

(54) LANDING GEAR

(75) Inventor: Stephen P. Grossman, El Segundo, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/651,486

(22) Filed: Aug. 30, 2000

(51) Int. Cl.⁷ .............................................. B64C 25/10
(52) U.S. Cl. .............................. 244/102 R; 244/102 SL
(58) Field of Search ...................... 244/102 R, 102 A, 244/102 SL

(56) References Cited

U.S. PATENT DOCUMENTS

| | | | |
|---|---|---|---|
| 1,768,696 A | 7/1930 | Laddon | 244/102 R |
| 1,929,255 A | 10/1933 | Northrop | 244/2 |
| 2,323,640 A | 7/1943 | Armstrong | 244/102 |
| 2,331,082 A | 10/1943 | Smith | 244/50 |
| 2,374,146 A | 4/1945 | Waters | 244/102 |
| 2,471,603 A | 5/1949 | Bishop | 244/102 |
| 2,982,500 A | 5/1961 | Lucien | 244/102 |
| 3,083,937 A | 4/1963 | Bainbridge et al. | 244/102 |
| 3,346,218 A | 10/1967 | Lucien | 244/102 |
| 3,384,331 A | 5/1968 | Palmer | 244/102 |
| 3,580,531 A | 5/1971 | Bremen et al. | 244/102 |
| 3,870,254 A | 3/1975 | Watts | 244/102 |
| 3,899,147 A * | 8/1975 | Masclet et al. | 244/102 R |
| 3,904,153 A | 9/1975 | Watts | 244/50 |
| 3,951,361 A | 4/1976 | Hrusch | 244/102 |
| 4,147,316 A | 4/1979 | Kendall et al. | 244/102 R |
| 4,170,332 A | 10/1979 | Masclet et al. | 244/102 |
| 4,189,117 A | 2/1980 | Masclet et al. | 244/102 R |
| 4,199,119 A | 4/1980 | Masclet | 244/102 |
| 4,228,975 A | 10/1980 | Sealey | 244/102 |
| 4,312,485 A | 1/1982 | Masclet et al. | 244/102 |
| 4,422,602 A | 12/1983 | Turiot | 244/102 |
| 4,433,820 A | 2/1984 | Turiot | 244/102 |
| 4,720,063 A * | 1/1988 | James et al. | 244/102 R |
| 4,770,372 A | 9/1988 | Ralph | 244/102 |
| 5,039,033 A | 8/1991 | Woerner et al. | 244/102 |
| 5,100,083 A * | 3/1992 | Large et al. | 244/102 SL |
| 5,478,030 A * | 12/1995 | Derrien et al. | 244/102 R |
| 5,522,566 A | 6/1996 | Hardy et al. | 244/137.1 |

FOREIGN PATENT DOCUMENTS

EP 0 115 435 A3 9/1984 ............ B64C/25/58

OTHER PUBLICATIONS

U.S. application No. 09/651,487, entitled, "*Landing Car*", Inventor Stephen P. Grossman, filed Aug. 30, 2000, Attorney Docket No. 019937.0182 (A–2273), pp. 1–23, 2 pages of drawings.

* cited by examiner

Primary Examiner—J. Woodrow Eldred
(74) Attorney, Agent, or Firm—Terry J. Anderson; Karl J. Hoch, Jr.

(57) ABSTRACT

The present invention provides a landing gear. The landing gear includes a trunnion having at least one principal pivot point. The principal pivot point is adapted to be pivotably coupled to an airframe to allow the trunnion to pivot about a principal trunnion pivot axis; the trunnion is operable to move between a deployed position and a stowed position by pivoting about the principal trunnion pivot axis. The trunnion further includes at least one secondary pivot point. The landing gear also includes a subframe having at least one principal pivot point. The principal pivot point of the subframe is pivotably coupled to the secondary pivot point of the trunnion to allow the subframe to pivot about a principal subframe pivot axis; the subframe is operable to move between a deployed position and a stowed position by pivoting about the principal subframe pivot axis. The landing gear further includes a wheel rotatably coupled to the subframe. The wheel is moved to a stowed position when the subframe pivots from the deployed position to the stowed position about the principal subframe pivot axis and the trunnion pivots from the deployed position to the stowed position about the principal trunnion pivot axis.

27 Claims, 3 Drawing Sheets

LANDING GEAR

TECHNICAL FIELD OF THE INVENTION

This invention relates generally to the field of aerospace structures and, more specifically, to landing gears.

BACKGROUND OF THE INVENTION

For the majority of their operation, landing gears support an aircraft while it is stationary on the ground. However, landing gears must also be able to support the aircraft when it is landing and moving on the ground. Thus, landing gears must be able to support not only the weight of the aircraft, but also the additional forces created when the aircraft lands and moves on the ground.

Also, when deployed, landing gears must place their associated wheel(s) in the appropriate position relative to the rest of the aircraft because the placement of the wheels affects the ground operations of the aircraft. For example, placing the wheels of the main landing gears too close to the longitudinal centerline of the aircraft will allow the aircraft to easily tip over. Furthermore, because the center of gravity of the aircraft is usually forward of the wheels of the main landing gears, placing these wheels too far aft on the aircraft will cause the aircraft to require additional force to rotate upwards during takeoff, requiring larger takeoff distances or horizontal control surfaces, Thus, upon deployment, landing gears must place their associated wheel(s) in the appropriate position as well as support the aircraft during its different modes of operation on the ground.

In addition, most landing gears must be retractable in order that they may be stowed within the skin of the aircraft after takeoff, which reduces aerodynamic drag. Because they are stowed within the skin of the airframe, reducing the space that landing gears require for stowage assists in reducing aerodynamic drag by reducing the lateral cross-section of the aircraft and/or allows more payload to be carried within the same lateral cross-section. Thus, landing gears that stow compactly are preferable.

Unfortunately, landing gears that stow compactly usually have many more components relative to non-compact landing gears, leading to increased manufacturing, installation, and maintenance costs. Moreover, as the number of components increases, the strength of the landing gears becomes a concern, especially if the landing gears must upon deployment place their associated wheel(s) far from the point where the landing gears couple to the aircraft.

SUMMARY OF THE INVENTION

The present invention provides landing gears that substantially reduce or eliminate at least some of the disadvantages and problems associated with previously developed landing gears. Accordingly, in certain embodiments, the present invention provides a landing gear that can place a wheel relatively far from the point where the landing gear couples to an airframe and yet be stowed in a relatively compact space within the airframe.

In particular embodiments, the landing gear includes a trunnion, a subframe, and a wheel. The trunnion has at least one principal pivot point, which is adapted to be pivotably coupled to an airframe to allow the trunnion to pivot about a principal trunnion pivot axis. The trunnion is operable to move between a deployed position and a stowed position by pivoting about the principal trunnion pivot axis. The trunnion further includes at least one secondary pivot point. The subframe also has at least one principal pivot point. This principal pivot point is pivotably coupled to the secondary pivot point of the trunnion to allow the subframe to pivot about a principal subframe pivot axis. The subframe is operable to move between a deployed position and a stowed position by pivoting about the principal subframe pivot axis. The wheel is rotatably coupled to the subframe and is moved to a stowed position when the subframe pivots from the deployed position to the stowed position about the principal subframe pivot axis and the trunnion pivots from the deployed position to the stowed position about the principal trunnion pivot axis.

In other embodiments, the present invention provides an aircraft utilizing a landing gear. The aircraft includes an airframe and a landing gear coupled to the airframe. The landing gear includes a trunnion having at least one principal pivot point, which is pivotably coupled to the airframe to allow the trunnion to pivot about a principal trunnion pivot axis. The trunnion is operable to move between a deployed position and a stowed position by pivoting about the principal trunnion pivot axis. The trunnion further includes at least one secondary pivot point. The landing gear also includes a subframe having at least one principal pivot point, which is pivotably coupled to the secondary pivot point of the trunnion to allow the subframe to pivot about a principal subframe pivot axis. The subframe is operable to move between a deployed position and a stowed position by pivoting about the principal subframe pivot axis. The landing gear further includes a wheel rotatably coupled to the subframe. The wheel is moved to a stowed position when the subframe pivots from the deployed position to the stowed position about the principal subframe pivot axis and the trunnion pivots from the deployed position to the stowed position about the principal trunnion pivot axis.

The present invention has several technical features and advantages. For example, in particular embodiments, the landing gear can place an associated wheel in the appropriate position relative to the airframe even if the position is relatively far from the point where the landing gear couples to the airframe. Thus, the landing gear can still place the associated wheel in the appropriate position relative to the airframe even when the landing gear must couple to the airframe relatively far from the position where the wheel is to be placed upon deployment. As another example, in certain embodiments, the landing gear can stow compactly within the skin of the airframe, which improves aerodynamic performance and/or cargo capacity of the aircraft. As a further example, in some embodiments, the landing gear may have a relatively small number of components, allowing for easy manufacture, installation, and maintenance of the landing gear. As an additional example, in several embodiments, the landing gear uses a box design for the trunnion, which reduces the weight of the landing gear. Of course, some embodiments possess multiple advantages and technical features.

Other technical features and advantages will be readily apparent to one of skill in the art from the following figures, description, and claims.

BRIEF DESCRIPTION OF THE DRAWINGS

To provide a more complete understanding of the present invention, and to further illuminate its technical features and advantages, especially when considered light of the following written description, reference is now made to the following drawings, in which.

DETAILED DESCRIPTION OF THE INVENTION

Figure 1:
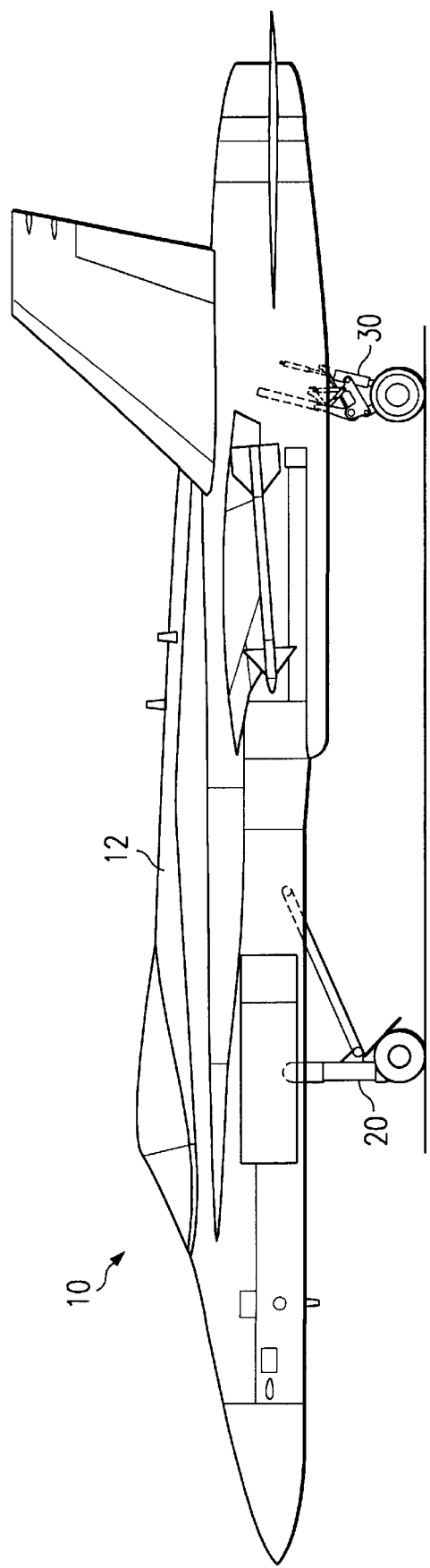
FIG. 1 illustrates a fighter aircraft utilizing a landing gear that is in accordance with the present invention.

FIG. 1 illustrates a fighter aircraft 10 utilizing a landing gear 30 that is in accordance with the present invention. As illustrated, landing gear 30 is a main landing gear of fighter aircraft 10. Landing gear 30, however, may be any type of landing gear. Fighter aircraft 10 also includes an airframe 12, a front landing gear 20, and a second main landing gear, which cannot be seen because it is hidden by landing gear 30 in FIG. 1. In particular embodiments, the second main landing gear is a mirror-image of landing gear 30, with the longitudinal center plane of fighter aircraft 10 serving as the mirror-image plane. Front landing gear 20, landing gear 30, and the second main landing gear couple to airframe 12 and support airframe 12 when fighter aircraft 10 is landing, moving, and stationary on the ground. Thus, front landing gear 20, landing gear 30, and the second main landing gear must be able to support not only the weight of fighter aircraft 10, but also the additional forces generated as fighter aircraft 10 lands and moves on the ground.

Airframe 12 may be composed of ribs, spars, struts, bulkheads, beams, skin, and/or any other suitable structural elements. In addition, these structural elements may be composed of steel, aluminum, titanium, composite, and/or any other suitable material.

Front landing gear 20, landing gear 30, and the second main landing gear may be coupled to any of a variety of the structural elements of airframe 12. However, front landing gear 20, landing gear 30, and the second main landing gear are typically principally coupled to bulkheads of airframe 12. Moreover, front landing gear 20, landing gear 30, and the second main landing gear are typically pivotably coupled to airframe 12, in order that retraction within the skin of airframe 12 is possible.

Figure 3:
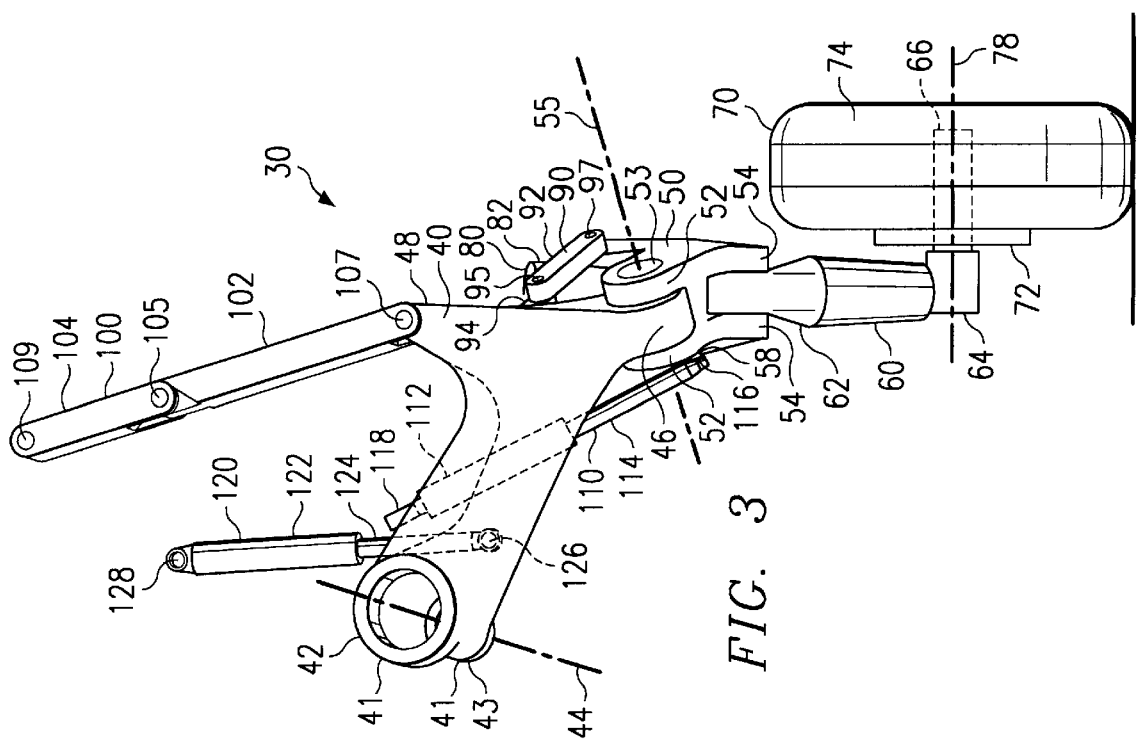
FIG. 3 illustrates a detailed front view of the landing gear in FIG. 1 in the deployed position.
Figure 2:
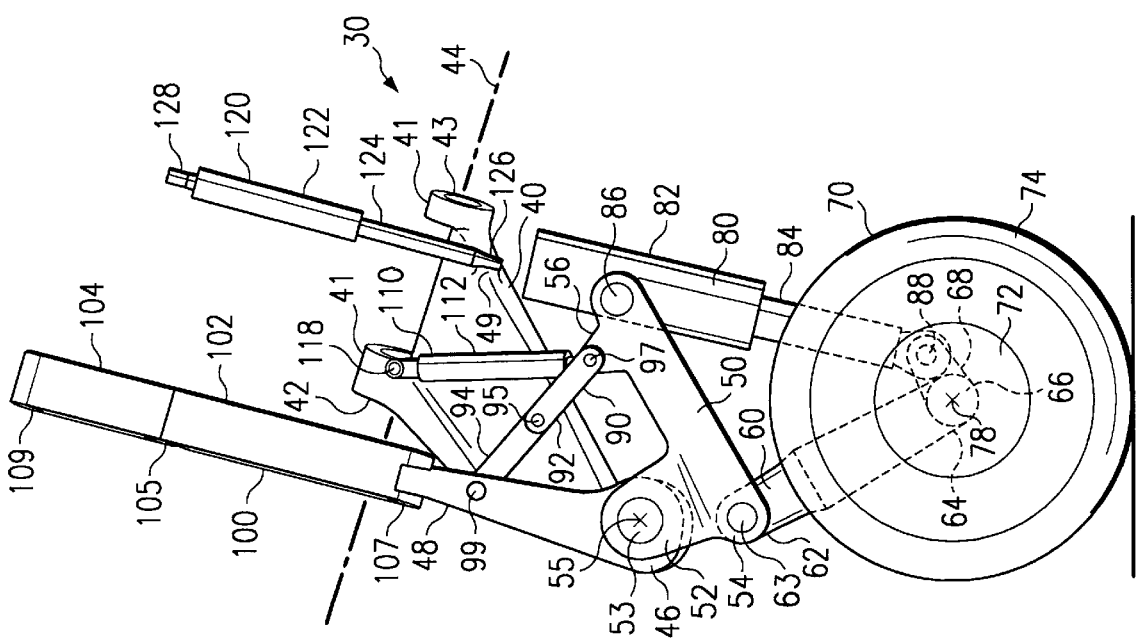
FIG. 2 illustrates a detailed side view of the landing gear in FIG. 1 in the deployed position.

FIG. 2 and FIG. 3 illustrate a detailed side view and a detailed front view, respectively, of landing gear 30 in the deployed position. As illustrated, landing gear 30 includes a trunnion 40, a subframe 50, a lever arm 60, a wheel 70, a shock damper 80, a subframe locking member 90, a trunnion locking member 100, a subframe actuator 110, and a trunnion actuator 120.

Trunnion 40 includes a yoke 41 that has a first principal pivot point 42 and a second principal pivot point 43 at each end. First principal pivot point 42 and second principal pivot point 43 assist in pivotably coupling trunnion 40 to airframe 12, allowing trunnion 40 to pivot relative to airframe 12 about a principal trunnion pivot axis 44, which may pass through the principal pivot point(s), as illustrated. Note, while principal trunnion pivot axis 44 is illustrated as being horizontally and vertically skewed relative to the longitudinal axis of airframe 12, principal trunnion pivot axis 44 may have a variety of orientations. By pivoting about principal trunnion pivot axis 44, trunnion 40 moves between a stowed and a deployed position. In the deployed position, which is shown in FIG. 2 and FIG. 3, trunnion 40 extends forward and outboard from first principal pivot point 42 and second principal pivot point 43. At the outboard end, trunnion 40 has a secondary pivot point 46, to which subframe 50 pivotably couples. As illustrated, secondary pivot point 46 is a lip located approximately twenty-two inches outboard and eight inches forward of first principal pivot point 42. Trunnion 40, however, may be sized differently for other embodiments. Trunnion 40 also includes a flange 48, to which trunnion locking member 100 couples, and a boss 49, to which trunnion actuator 120 couples.

As illustrated, first principal pivot point 42, second principal pivot point 43, and secondary pivot point 46 each include an aperture through which a pin may be inserted to pivotably couple trunnion 40 to airframe 12 and to pivotably couple subframe 50 to trunnion 40, respectively. First principal pivot point 42, second principal pivot point 43, and secondary pivot point 46, however, may be shafts, pins, axles, sleeves, sockets, and/or any other type of device that allows one element to pivot relative to a coupled element with a prescribed degree of freedom. In particular embodiments, any number of pivot points may be used for pivotably coupling trunnion 40 to airframe 12 and to subframe 50. Moreover, the pivot points may be arranged in various manners on trunnion 40. Additionally, the coupling points—flange 48 and boss 49—may be any type of device that assists in coupling one structural component to another structural component and may be arranged in a variety of manners on trunnion 40.

Trunnion 40 may be composed of titanium, steel, aluminum, composite, and/or any other suitable material. Additionally, trunnion 40 may be manufactured as a solid member or as a hollow member. In a particular embodiment, trunnion 40 is as a box section. Manufacturing trunnion 40 as a hollow member has the advantage of reducing the weight of trunnion 40 with only a relatively modest decrease in strength.

Subframe 50 couples lever arm 60 and shock damper 80 to trunnion 40. Subframe 50 includes a principal pivot point 52, illustrated as a yoke, for coupling to secondary pivot point 46 of trunnion 40. As illustrated, principal pivot point 52 couples to secondary pivot point 46 by having a pin 53 inserted through principal pivot point 52 and secondary pivot point 46. Subframe 50 pivots relative to trunnion 40 about a principal subframe pivot axis 55, which may pass through principal pivot point 52, as illustrated. Note, while principal subframe pivot axis 55 is illustrated as being horizontally and vertically skewed relative to the lateral axis of airframe 12, principal subframe pivot axis 55 may have a variety of orientations. By pivoting about principal subframe pivot axis 55, subframe 50 moves between a deployed and a stowed position Subframe 50 also includes a secondary pivot point 54, also illustrated as a yoke, for coupling to lever arm 60. Subframe 50 her includes a flange 56 and a boss 58. Flange 56 allows subframe locking member 90 to couple to subframe 50, and boss 58 allows subframe actuator 110 to couple to subframe 50.

As illustrated, principal pivot point 52 and secondary pivot point 54 of subframe 50 each include an aperture through which a pin may be inserted to pivotably couple subframe 50 to trunnion 40 and lever arm 60, respectively. Principal pivot point 52 and secondary pivot point 54, however, may be shafts, pins, axles, sleeves, sockets, and/or any other type of device that allows an element to pivot relative to a coupled element with a prescribed degree of freedom. In particular embodiments, any number of pivot points may be used for coupling subframe 50 to trunnion 40 and lever arm 60. Moreover, the pivot points may be arranged in various manners on subframe 50. Additionally, the coupling points—flange 56 and boss 58—may be any type of device that assists in coupling one structural component to another structural component and may be arranged in a variety of manners on subframe 50.

Subframe 50 may be composed of titanium, steel, aluminum, composite, and/or any other suitable material. Additionally, subframe 50 may be a solid or hollow member. In a particular embodiment, subframe 50 is a box section. Manufacturing subframe 50 as a hollow member has the advantage of reducing the weight of subframe 50 with only a relatively modest decrease in strength. Subframe 50 may have different sizes and shapes in different embodiments.

Lever arm 60 couples wheel 70 to subframe 50. Lever arm 60 has a first end 62 and a second end 64. As illustrated, lever arm 60 is pivotably coupled to subframe 50 at first end 62 by a pin 63 inserted through secondary pivot point 54 of subframe 50 and an aperture in first end 62. At second end 64, lever arm 60 has an axle 66 to which wheel 70 is rotatably coupled. Axle 66 may be rotatably coupled to wheel 70 by any of a variety of mechanisms well known to those of skill in the art. Lever arm 60 also includes a flange 68 to which shock damper 80 couples.

Lever arm 60 may be a rod, a strut, a shaft, or any other device that can pivotably couple wheel 70 to subframe 50. Lever arm 60 may be composed of steel, aluminum, titanium, composite, and/or any other suitable material. Additionally, the coupling point—flange 68—may be any type of device that assists in coupling one structural component to another structural component and may be arranged in a variety of manners on lever arm 60.

Wheel 70 includes a hub 72 and a tire 74. Hub 72 rotatably couples to axle 66, and tire 74 is mounted to hub 72. Wheel 70 has a rolling axis 78 that passes through the center of hub 72 and axle 66. Rolling axis 78 is typically substantially perpendicular to the longitudinal axis of airframe 12. Wheel 70 may be composed of any of a variety of materials well known to those of skill in the art.

Although axle 66 has been illustrated as being a part of lever arm 60, axle 66 could instead be a part of wheel 70, coupled to hub 72. In this embodiment, axle 66 would rotate with hub 72 of wheel 70 and be captured in a sleeve in second end 64 of lever arm 60. Other rotatable couplings between lever arm 60 and wheel 70 well known to those of skill may be used in other embodiments.

Also coupling wheel 70 to subframe 50 is shock damper 80. Shock damper 80 lessens the shock to landing gear 30 of abrupt forces applied to wheel 70, as when landing. Shock damper 80 includes a chamber 82 and a piston 84. Chamber 82 may include a gas, a liquid, and/or a mechanical device, such as a spring, for providing variable resistance to piston 84 as it is inserted into chamber 82. Note, in general, shock damper 80 may be any device that lessens the shock to landing gear 30 when abrupt forces are applied to wheel 70. As illustrated, chamber 82 of shock damper 80 is pivotably coupled to subframe 50 by a pin 86, and piston 84 is pivotably coupled to flange 68 of lever arm 60 by a pin 88. These pivotable couplings may also be pins, shafts, axles, sleeves, sockets, and/or any other device that couples one element to another element while allowing the elements to pivot relative to each other with a prescribed degree of freedom. Shock damper 80 may be composed of any of a variety of materials well known to those skilled in the art.

Although the coupling between subframe 50 and wheel 70 has been illustrated and described as being achieved by lever arm 60 and shock damper 80, a variety of other manners exist for coupling wheel 70 to subframe 50. For example, wheel 70 may be directly coupled to subframe 50, without the aid of lever arm 60 and shock damper 80. In other embodiments, wheel 70 may be coupled to subframe 50 forward of secondary pivot point 54. Thus, there are a variety of manners in which to couple wheel 70 to subframe 50 and still achieve at least some of the advantages of the present invention. Furthermore, in particular embodiments, landing gear 30 may have multiple wheels.

Subframe locking member 90 prevents subframe 50 from pivoting about principal subframe pivot axis 55 when landing gear 30 is supporting airframe 12. To accomplish this, subframe locking member 90, as illustrated, couples to flange 48 of trunnion 40 and to flange 56 of subframe 50. Thus, subframe locking member 90 performs its function by being placed into compression when landing gear 30 is supporting airframe 12.

As illustrated, subframe locking member 90 includes a first link 92 and a second link 94. First link 92 is pivotably coupled to second link 94 by a pivotable coupler 95. First link 92 is also pivotably coupled to flange 56 of subframe 50 by a pivotable coupler 97. In addition, second link 94 is pivotably coupled to flange 48 of trunnion 40 by a pivotable coupler 99.

First link 92 and second link 94 may be composed of aluminum, steel, titanium, composite, and/or any other suitable material. In particular embodiments, first link 92 and second link 94 are shaped as I-beams. Pivotable coupler 95, pivotable coupler 97, and pivotable coupler 99 may be pins, axles, shafts, sleeves, sockets, and/or any other type of device that allows an element to pivot relative to a coupled element with a prescribed degree of freedom.

In certain embodiments, an actuator may be coupled to pivotable coupler 95, first link 92, and/or second link 94. This actuator would facilitate the pivoting of first link 92 relative to second link 94 when subframe 50 begins to pivot from the deployed position. In addition, this actuator could serve to lock pivotable coupler 95 into place upon the deployment of subframe 50. The actuator may be a hydraulic actuator, an electric actuator, or any other type of device that can facilitate the pivoting of a first member relative to a pivotably coupled second member and/or the locking of the first member relative to the second member.

In other embodiments, subframe locking member 90 may have a different number of links. For example, subframe locking member 90 may have only one link, meaning that subframe locking member 90 is a rigid member, or a plurality of links that can form a rigid member. In general, therefore, subframe locking member 90 may have any configuration that can support compressive loads to prevent subframe 50 from pivoting about principal subframe pivot axis 55. In other embodiments, however, subframe locking member 90 may be used to support tensile loads to prevent subframe 50 from pivoting about principal subframe pivot axis 55.

Trunnion locking member 100 prevents trunnion 40 from pivoting relative to airframe 12 about principal trunnion pivot axis 44 when landing gear 30 is supporting airframe 12. In the illustrated embodiment, trunnion locking member 100 performs this function by being placed into compression when landing gear 30 is supporting airframe 12.

As illustrated, trunnion locking member 100 couples to trunnion 40 and is adapted to be coupled to airframe 12 and includes a first link 102 and a second link 104. First link 102 is pivotably coupled to second link 104 by a pivotable coupler 105. First link 102 is also pivotably coupled to flange 48 of trunnion 40 by a pivotable coupler 107. Additionally, second link 104 can be pivotably coupled to airframe 12 by a pivotable coupler 109.

First link 102 and second link 104 may be composed of aluminum, steel, titanium, composite, and/or any other suitable material. In particular embodiments, first link 102 and second link 104 are shaped as I-beams. Pivotable coupler 105, pivotable coupler 107, and pivotable coupler 109 may be pins, axles, shafts, sleeves, sockets, and/or any other type of device that allows an element to pivot relative to a coupled element with a prescribed degree of freedom.

In certain embodiments, an actuator may be coupled to pivotable coupler 105, first link 102, and/or second link 104. This actuator would facilitate the pivoting of first link 102 relative to second link 104 when trunnion 40 begins to pivot from the deployed position. In addition, this actuator could serve to lock pivotable coupler 105 into place upon the deployment of trunnion 40. The actuator may be a hydraulic actuator, an electric actuator, or any other type of device that can facilitate the pivoting of a first member relative to a pivotably coupled second member and/or the locking of the first member relative to the second member.

In other embodiments, trunnion locking member 100 may have a different number of links. For example, trunnion locking member 100 could have only one link, meaning that trunnion locking member 100 is a rigid member, or a plurality of links that can form a rigid member. In general, therefore, trunnion locking member 100 may have any configuration that can support compressive loads to prevent trunnion 40 from pivoting about principal trunnion pivot axis 44. In other embodiments, however, trunnion locking member 100 may be used to support tensile loads to prevent trunnion 40 from pivoting about principal trunnion pivot axis 44.

Subframe actuator 110 causes subframe 50 to pivot about principal subframe pivot axis 55. To accomplish this, subframe actuator 110, as illustrated, includes a chamber 112 and a piston 114. Chamber 112 may actuate piston 114 hydraulically, pneumatically, electrically, and/or in any other manner to cause piston 114 to extend and retract. By extending and retracting piston 114, subframe actuator 110 causes subframe 50 to pivot about principal subframe pivot axis 55. Subframe actuator 110 is coupled to subframe 50 by a pivotable coupler 116 and to trunnion 40 by a pivotable coupler 118. Pivotable coupler 116 and pivotable coupler 118 may be pins, shafts, axles, sleeves, sockets, and/or any other type of device that allows one element to pivot relative to a coupled element with a prescribed degree of freedom. Subframe actuator 110 may be composed of any suitable material. In general, therefore, subframe actuator 110 may be any device that can cause subframe 50 to pivot about principal subframe pivot axis 55.

Trunnion actuator 120 causes trunnion 40 to pivot about principal trunnion pivot axis 44. To accomplish this, trunnion actuator 120, as illustrated, includes a chamber 122 and a piston 124. Chamber 122 may actuate piston 124 hydraulically, pneumatically, electrically, and/or in any other manner to cause piston 124 to extend and retract. By extending and retracting piston 124, trunnion actuator 120 causes trunnion 40 to pivot about principal trunnion pivot axis 44. Trunnion actuator 120 is coupled to trunnion 40 by a pivotable coupler 126 and is adapted to be pivotably coupled to airframe 12 by a pivotable coupler 128. Pivotable coupler 126 and pivotable coupler 128 may be pins, shafts, axles, sleeves, sockets, and/or any other type of device that allows an element to pivot relative to a coupled element with a prescribed degree of freedom. Trunnion actuator 120 may be composed of any suitable material. In general, therefore, trunnion actuator 120 may be any device that can cause trunnion 40 to pivot about principal trunnion pivot axis 44.

In operation, landing gear 30 supports airframe 12 while landing, moving, and stationary on the ground. During landing, trunnion 40 and subframe 50, and, hence, wheel 70, are in the deployed position, and, when wheel 70 is not in contact with the ground, piston 84 of shock damper 80 is extended. As wheel 70 touches the ground, however, an upward force is generated on wheel 70. This force pushes piston 84 into chamber 82, where the dampening mechanism mollifies the shock of the force applied to trunnion 40 and subframe 50. This force also creates a moment about principal trunnion pivot axis 44 and principal subframe pivot axis 55. These moments, however, are counteracted by trunnion locking member 100 and subframe locking member 90, respectively, which are placed into compression due to the moments created by the forces on wheel 70 in the illustrated embodiment. As wheel 70 comes into continuous contact with the ground, piston 84 is forced into chamber 82 until it reaches an equilibrium position, and trunnion locking member 100 and subframe locking member 90 have continuous compression applied to them.

As illustrated in FIGS. 2 and 3, landing gear 30 has several advantages. As best seen in FIG. 3, when landing gear 30 is deployed, trunnion 40 and subframe 50 of landing gear 30 place the center of wheel 70 approximately thirty-three inches outboard of first principal pivot point 42. Thus, landing gear 30 allows the center of wheel 70 to be placed outboard of the principal point at which trunnion 40 pivotably couples to airframe 12. In other embodiments, however, the shape of trunnion 40 and subframe 50 may be modified to place the center of wheel 70 in different positions relative to airframe 12. In addition, landing gear 30 has a relatively small number of structural elements, which reduces manufacturing, installation, and maintenance costs.

Figure 4:
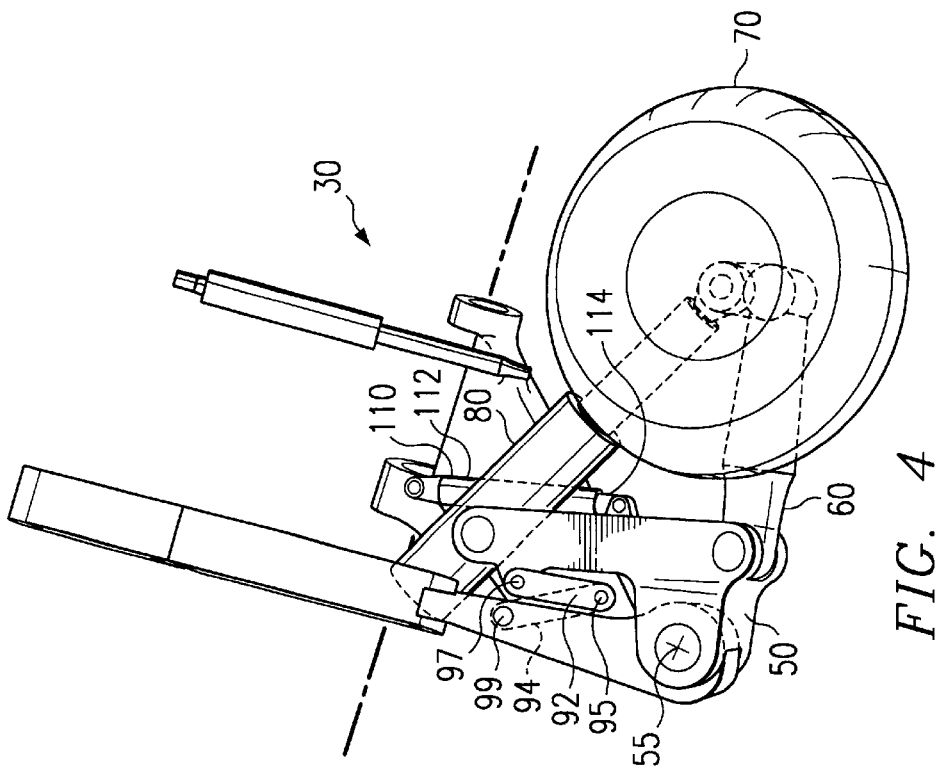
FIG. 4 illustrates a detailed side view of the landing gear in FIG. 1 during transition to the stowed position.

FIG. 4 illustrates a detailed side view of landing gear 30 during transition to the stowed position. To place landing gear 30 in this position, subframe actuator 110 retracts piston 114 into chamber 112. Due to this retraction, subframe 50, along with lever arm 60, wheel 70, and shock damper 80, pivots about principal subframe pivot axis 55, and first link 92 and second link 94 pivot relative to each other about pivotable coupler 95. In addition, first link 92 pivots relative to subframe 50 about pivotable coupler 97, and second link 94 pivots relative to trunnion 40 about pivotable coupler 99.

Also due to this retraction, lever arm 60, wheel 70, and shock damper 80 move towards trunnion 40. This movement causes landing gear 30 to require less space when stowed within the skin of airframe 12. Furthermore, due to the skew in principal subframe pivot axis 55, lever arm 60, wheel 70, and shock damper 80 also move inboard during the retraction. This inboard movement also allows landing gear 30 to occupy less space when stowed within the skin of airframe 12, even when wheel 70 is positioned outboard of the principal point at which landing gear 30 pivotably couples to airframe 12. As best seen in FIG. 3, principal subframe pivot axis 55 is skewed approximately three degrees laterally and approximately fifteen degrees vertically relative to rolling axis 78 of wheel 70, when deployed. The vertical skew and the horizontal skew of principal subframe pivot axis 55, however, may be adjusted as needed to achieve the appropriate inboard movement during retraction. In particular embodiments, principal subframe pivot axis 55 may be skewed either laterally or vertically relative to rolling axis 78 of wheel 70, when deployed. In other embodiments, however, principal subframe pivot axis 55 may be substantially parallel with rolling axis 78 of wheel 70, when deployed.

Figure 5:
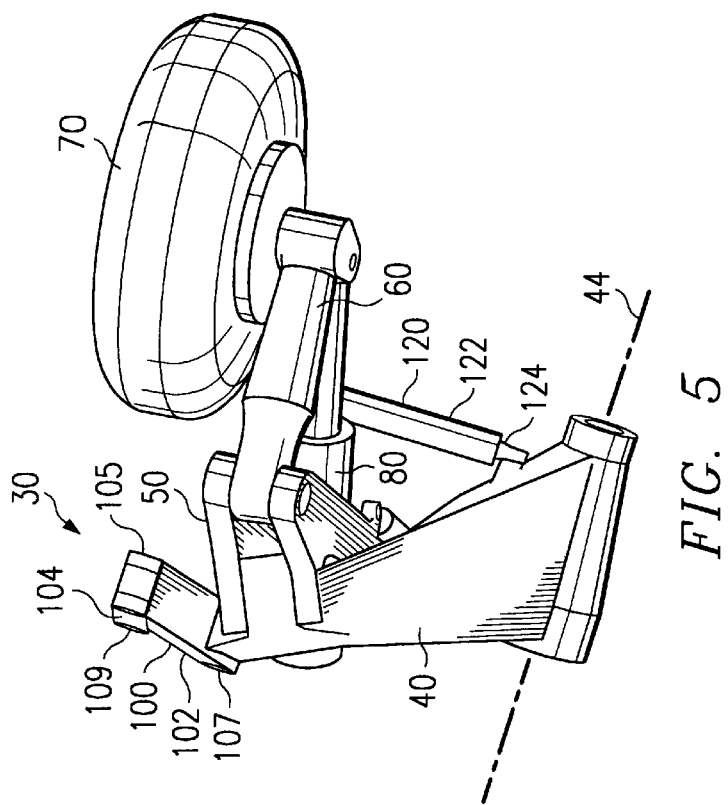
FIG. 5 illustrates a detailed side view of the landing gear in FIG. 1 in the stowed position.

FIG. 5 illustrates a detailed side view of landing gear 30 in the stowed position. To place landing gear 30 in this position, beginning at FIG. 4, trunnion actuator 120 retracts piston 124 into chamber 122. Due to this retraction, trunnion 40, along with subframe 50, lever arm 60, wheel 70, and shock damper 80, pivots about principal trunnion pivot axis 44. Also due to this retraction, first link 102 and second link 104 of trunnion locking member 100 pivot relative to each other about pivotable coupler 105. In addition, first link 102 pivots relative to trunnion 40 about pivotable coupler 107, and second link 104 pivots relative to airframe 12 about pivotable coupler 109.

Furthermore, due to the skew in principal trunnion pivot axis 44, subframe 50, lever arm 60, wheel 70, and shock damper 80 move inboard during the retraction. This inboard movement, at least in part, allows wheel 70 of landing gear 30 to be positioned outboard of the principal point at which landing gear 30 pivotably couples to airframe 12. As best seen in FIGS. 2 and 3, principal trunnion pivot axis 44 is skewed approximately nineteen degrees laterally and approximately seventeen degrees vertically relative to the longitudinal axis of airframe 12. The vertical skew and the horizontal skew of principal trunnion pivot axis 44, however, may be adjusted as needed to achieve the appropriate inboard movement during retraction. In particular embodiments, principal trunnion pivot axis 44 may be skewed either laterally or vertically relative to rolling axis 78 of wheel 70, when deployed. In other embodiments, however, principal trunnion pivot axis 44 may be substantially parallel with rolling axis 78 of wheel 70, when deployed.

Although FIG. 4 and FIG. 5 only illustrate how trunnion actuator 120 and subframe actuator 110 operate to stow landing gear 30, these actuators can also deploy landing gear 30. To deploy landing gear 30, trunnion actuator 120 extends piston 124. This extension causes trunnion 40 to again pivot about principal trunnion pivot axis 44, this time, however, in the opposite direction from that during stowing. This pivoting, in turn, causes first link 102 of trunnion locking member 100 to pivot relative to second link 104 about pivotable coupler 105 and subframe 50, lever arm 60, wheel 70, and shock damper 80 to move to the position shown in FIG. 4. Because of the skew of principal trunnion pivot axis 44, subframe 50, lever arm 60, wheel 70, and shock damper 80 move outboard during this pivoting.

After trunnion actuator 120 has extended piston 124, subframe actuator 110 extends piston 114. This extension causes subframe 50 to again pivot about principal subframe pivot axis 55, this time, however, in the opposite direction from that during stowing. This pivoting, in turn, causes first link 92 of subframe locking member 90 to pivot relative to second link 94 about pivotable coupler 95 and lever arm 60, wheel 70, and shock damper 80 to move to the position shown in FIG. 2. Because of the skew of principal subframe pivot axis 55, lever arm 60, wheel 70, and shock damper 80 move outboard during this pivoting as well, as shown in FIG. 3.

Although the discussion of the operation of landing gear 30 has centered on t trunnion actuator 120 and subframe actuator 110 operating in sequence, trunnion actuator 120 and subframe actuator 110 may operate in a variety of other manners. For example, in particular embodiments, trunnion actuator 120 and subframe actuator 110 may operate simultaneously in deploying and stowing landing gear 30. A variety of other sequences exist.

Although landing gear 30 has been illustrated and described as being useful for fighter aircraft 10, landing gear 30 could also be useful in any other type of military or commercial aircraft. In addition, landing gear 30 could also be useful in any type of aircraft, not just airplanes.

Although several embodiments of the present invention have been discussed, numerous additions, deletions, substitutions, and/or alterations to the invention may be readily suggested to one of skill in the art without departing from the scope of the appended claims. It is intended therefore that the appended claims encompass such additions, deletions, substitutions, and/or alterations.

What is claimed is:

1. A landing gear, comprising:
   a trunnion having at least one principal pivot point, the principal pivot point adapted to be pivotably coupled to an airframe to allow the trunnion to pivot about a principal trunnion pivot axis, the trunnion operable to move between a deployed position and a stowed position by pivoting about the principal trunnion pivot axis, the trunnion having at least one secondary pivot point;
   a subframe having at least one principal pivot point, the principal pivot point of the subframe pivotably coupled to the secondary pivot point of the trunnion to allow the subframe to pivot about a principal subframe pivot axis, the subframe operable to move between a deployed position and a stowed position by pivoting about the principal subframe pivot axis;
   an actuator coupled to the subframe and operable to move the subframe between the deployed position and the stowed position; and
   a wheel rotatably coupled to the subframe, the wheel moved to a stowed position when the subframe pivots from the deployed position to the stowed position about the principal subframe pivot axis and the trunnion pivots from the deployed position to the stowed position about the principal trunnion pivot axis.

2. The landing gear of claim 1, further comprising a lever arm comprising a first end and a second end, the first end pivotably coupled to the subframe and the second end rotatably coupled to the wheel.

3. The landing gear of claim 2, further comprising a shock damper coupled to the lever arm and coupled to the subframe.

4. The landing gear of claim 1, further comprising a trunnion locking member comprising a first end and a second end, the first end coupled to the trunnion and the second end adapted to be coupled to an airframe.

5. The landing gear of claim 4, wherein the trunnion locking member comprises two pivotably coupled links placed into compression when the wheel is supporting an airframe.

6. The landing gear of claim 1, further comprising an actuator coupled to the trunnion and adapted to be coupled to an airframe, the actuator operable to move the trunnion between the deployed position and the stowed position.

7. The landing gear of claim 1, further comprising a subframe locking member comprising a first end and a second end, the first end coupled to the subframe and the second end coupled to the trunnion.

8. The landing gear of claim 7, wherein the subframe locking member comprises two pivotably coupled links placed into compression when the wheel is supporting an airframe.

9. The landing gear of claim 1, wherein the actuator is also coupled to the trunnion.

10. The landing gear of claim 1, wherein the principal subframe pivot axis is skewed relative to the rolling axis of the wheel, when deployed.

11. The landing gear of claim 10, wherein the principal subframe pivot axis is skewed vertically and laterally relative to the rolling axis of the wheel, when deployed.

12. A method for using a landing gear, comprising:

providing a landing gear having a trunnion pivotably coupled to an airframe to allow the trunnion to pivot about a principal trunnion pivot axis between a deployed position and a stowed position and a subframe pivotably coupled to the trunnion to allow the subframe to pivot about a principal subframe pivot axis between a deployed position and a stowed position;

pivoting the trunnion relative to the airframe from the stowed position to the deployed position about the principal trunnion pivot axis; and pivoting the subframe relative to the trunnion from the stowed position to the deployed position about the principal subframe pivot axis by extending an actuator coupled to the subframe;

wherein the pivoting of the trunnion and the subframe moves a wheel of the landing gear into a deployed position.

13. The method of claim 12, wherein the actuator is also coupled to the trunnion.

14. The method of claim 12, further comprising dampening at least some of the forces applied to the wheel with a shock damper coupled to the trunnion and coupled to the subframe, the forces creating a first moment about the principal subframe pivot axis and a second moment about the principal trunnion pivot axis.

15. The method of claim 14, further comprising;

generating a third moment about the principal subframe pivot axis to counteract the first moment; and generating a fourth moment about the principal trunnion pivot axis to counteract the second moment.

16. The method of claim 15, wherein generating a third moment comprises placing a locking member into compression.

17. The method of claim 16, wherein the locking member comprises a first link and a second link, the first link coupled to the trunnion and the second link coupled to the subframe.

18. The method of claim 17, further comprising locking the first link relative to the second link after the subframe has moved into the deployed position.

19. The method of claim 12, wherein the principal subframe pivot axis is skewed relative to the rolling axis of the wheel, when deployed.

20. An aircraft utilizing a landing gear, comprising:

an airframe; and a landing gear coupled to the airframe, the landing gear comprising:

a trunnion having at least one principal pivot point, the principal pivot point pivotably coupled to the airframe to allow the trunnion to pivot about a principal trunnion pivot axis, the trunnion operable to move between a deployed position and a stowed position by pivoting about the principal trunnion pivot axis, the trunnion having at least one secondary pivot point;

a subframe having at least one principal pivot point, the principal pivot point of the subframe pivotably coupled to the secondary pivot point of the trunnion to allow the subframe to pivot about a principal subframe pivot axis, the subframe operable to move between a deployed position and a stowed position by pivoting about the principal subframe pivot axis;

an actuator coupled to the subframe and operable to move the subframe between the deployed position and the stowed position; and a wheel rotatably coupled to the subframe, the wheel moved to a stowed position when the subframe pivots from the deployed position to the stowed position about the principal subframe pivot axis and the trunnion pivots from the deployed position to the stowed position about the principal trunnion pivot axis.

21. The aircraft of claim 20, further comprising a lever arm comprising a first end and a second end, the first end pivotably coupled to the subframe and the second end rotatably coupled to the wheel.

22. The aircraft of claim 21, further comprising a shock damper coupled to the lever arm and coupled to the subframe.

23. The aircraft of claim 20, further comprising a trunnion locking member comprising a first end and a second end, the first end coupled to the trunnion and the second end coupled to the airframe.

24. The aircraft of claim 20, further comprising a subframe locking member comprising a first end and a second end, the first end coupled to the subframe and the second end coupled to the trunnion.

25. The aircraft of claim 24, wherein the subframe locking member comprises two pivotably coupled links placed into compression when the wheel is supporting the airframe.

26. The aircraft of claim 20, wherein the actuator is also coupled to the trunnion.

27. The aircraft of claim 20, wherein the principal subframe pivot axis is skewed relative to the rolling axis of the wheel, when deployed.

* * * * *